(12) United States Patent
Kumar et al.

(10) Patent No.: US 10,599,718 B2
(45) Date of Patent: Mar. 24, 2020

(54) SYSTEMS AND/OR METHODS FOR GRAPH BASED DECLARATIVE MAPPING

(71) Applicant: Software AG, Darmstadt (DE)

(72) Inventors: Roshan Kumar, Hyderabad (IN); Gyanendra Singh Baiswar, Barabanki (IN)

(73) Assignee: SOFTWARE AG, Darmstadt (DE)

( * ) Notice: Subject to any disclaimer, the term of this patent is extended or adjusted under 35 U.S.C. 154(b) by 976 days.

(21) Appl. No.: 14/879,276

(22) Filed: Oct. 9, 2015

(65) Prior Publication Data

US 2017/0103143 A1    Apr. 13, 2017

(51) Int. Cl.
*G06F 16/84* (2019.01)
*G06F 16/23* (2019.01)
*G06F 16/901* (2019.01)

(52) U.S. Cl.
CPC ......... *G06F 16/86* (2019.01); *G06F 16/2365* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 7,596,573 | B2 | 9/2009 | O'Neil et al. |
| 7,739,223 | B2 | 6/2010 | Vaschillo et al. |
| 7,827,205 | B2 | 11/2010 | Okunseinde et al. |
| 8,977,600 | B2 | 3/2015 | Crupi et al. |
| 2003/0120665 | A1* | 6/2003 | Fox .................. G06F 17/30557 |
| 2004/0093342 | A1 | 5/2004 | Arbo et al. |
| 2005/0203960 | A1* | 9/2005 | Suarez ..................... G06F 8/33 |
| 2006/0117073 | A1* | 6/2006 | Bosworth ......... G06F 17/30575 |
| 2006/0248458 | A1* | 11/2006 | Li ...................... G06F 17/30684 715/700 |

(Continued)

OTHER PUBLICATIONS

Wikipedia—Ontology (Information Science), retrieved online Oct. 9, 2015, pp. 1-12. https://en.wikipedia.org/wiki/Ontology_(information_science).

(Continued)

*Primary Examiner* — Usmaan Saeed
*Assistant Examiner* — Yu Zhao
(74) *Attorney, Agent, or Firm* — Nixon & Vanderhye, P.C.

(57) ABSTRACT

Techniques for mapping from one or more source information sets to one or more target information sets are provided. Mapping ontologies associate a first declarative expression with a first information set from which to read first information, and a second declarative expression with a second information set to which second information determined based upon the read first information is written. A mapping graph having a nodes arranged according to an execution flow for obtaining the one or more target information sets is generated, at least some of these nodes representing respective ones of the mapping ontologies. The one or more target information sets are generated, each including information determined from the one or more source information sets, by traversing the mapping graph according to the execution flow. Each of the first and second declarative expressions may be associated with a mapping resolver for accessing one or more information sets.

21 Claims, 7 Drawing Sheets

(56) References Cited

U.S. PATENT DOCUMENTS

| | | | |
|---|---|---|---|
| 2007/0112714 A1* | 5/2007 | Fairweather | G06F 8/427 |
| | | | 706/46 |
| 2007/0179939 A1* | 8/2007 | O'Neil | G06F 16/252 |
| 2008/0082569 A1* | 4/2008 | Mansour | G06Q 10/10 |
| 2008/0256121 A1* | 10/2008 | Liu | G06F 16/283 |
| 2009/0240935 A1* | 9/2009 | Shukla | G06F 9/44505 |
| | | | 713/100 |
| 2014/0244692 A1* | 8/2014 | Williamson | G06F 17/2247 |
| | | | 707/791 |
| 2014/0317130 A1 | 10/2014 | Thope et al. | |
| 2014/0372928 A1 | 12/2014 | Malks et al. | |
| 2015/0261881 A1* | 9/2015 | Wensel | G06F 16/9024 |
| | | | 707/798 |
| 2015/0347149 A1* | 12/2015 | Galati | G06F 17/11 |
| | | | 712/201 |
| 2016/0004578 A1* | 1/2016 | Selig, IV | G06F 9/44505 |
| | | | 719/313 |

OTHER PUBLICATIONS

Wikipedia—Metadata, retrieved online Oct. 9, 2015, pp. 1-12. https://en.wikipedia.org/wiki/Metadata.

* cited by examiner

FIG. 1

```
{
  "total": 10,
  "details":[
    {
      "name":"Name1",
      "email":"name1@example.com",
      "photo":"SGDFTTZS",
      "tweets":["tweet1","tweet2","tweet3","tweet4","tweet5"],
      "linkedIn":"https://www.linkedin.com/in/name1",
      "skill":"Novice"
    },{
      "name":"Name2",
      "email":"name2@example.com",
      "photo":"SGDFTTZS",
      "tweets":["tweet1","tweet2","tweet3","tweet4","tweet5"],
      "linkedIn":"https://www.linkedin.com/in/name2",
      "skill":"Expert"
    }
  ]
}
```

```
<if id="rule0" expression="${http.header['operation']} == 'employeesDetails'">
    <rule id="rule1" source="${json.employees}" target="${http.body}", target="${log.info}">
        <!-- Set total number of employees-->
        <rule id="rule2" source="${db.employees.count}" target="${json.employees.total}" />
        <!-- Aggregate employee information for each employee-->
        <rule id="rule3" source="${json.employee}" contex="emp::${db.employees.all.each},
target="${json.employees.details}"
photo::${ftp['emp_data'].filter[type == 'png']}">
            <rule id="rule4" source="${context['emp'].name}" target="${json.employee.name}" />
            <rule id="rule5" source="${context['emp'].email}" target="${json.employee.email}" />
            <rule id="rule6"
source="${base64Encode(context['photo'].get(json.employee.name))}"
target="${json.employee.photo}" />
            <rule id="rule7"
source="${twitter[json.employee.email].stream['5']}" target="${json.employee.tweets}"
/>
            <rule id="rule8"
source="${linkedIn[json.employee.email].url}" target="${json.employee.linkedIn}" />
            <rule id="rule9" source="${var['skill']}"
target="${json.employee.skill}">
                <if expression="${context['emp'].experience} < 3">
                    <rule id="rule10" source="Novice"
target="${var['skill']}" />
                </if>
                <elseif expression="${context['emp'].experience} <
10">
                    <rule id="rule11" source="Proficient"
target="${var['skill']}" />
                </elseif>
                <else>
                    <rule id="rule12" source="Expert"
target="${var['skill']}" />
                </else>
            </rule>
        </rule>
        <rule id="16" source="text/json" target="${http.header['type']}" />
</if>
```

SYSTEMS AND/OR METHODS FOR GRAPH BASED DECLARATIVE MAPPING

TECHNICAL FIELD

Certain example embodiments described herein relate to techniques for computer software processing. More particularly, certain example embodiments relate to techniques to mapping content from one or more sources to one or more destinations.

BACKGROUND AND SUMMARY OF EXAMPLE EMBODIMENTS OF THE INVENTION

An enterprise system usually includes several interconnected systems exchanging data with each other. For example, the processing of content of multiple MIME types from multiple sources is often a useful aspect in enabling heterogeneous systems to communicate with each other, while providing efficient and generally good performance. As is known, MIME (Multi-Purpose Internet Mail Extensions) is a standard for formatting files of different types, such as text, graphics, or audio, e.g., so they can be sent over the Internet and seen or played by a web browser or e-mail application. See, for example, IETF Request for Comments 1521 and 1522.

Unfortunately, however, some conventional techniques for facilitating communication between such systems may be deficient in the level of flexibility and/or the efficiency demanded by many modern applications. For example, some conventional techniques may be not be adequately flexible for applications that leverage multiple sources of Big Data and/or dynamically changing content streams as source content for providing users with aggregated content on a real-time or near real-time basis. Some conventional techniques lack support for one or more of unstructured source content, content of multiple MIME types, dynamically updating transformation from source content to target content, being responsive to dynamic changes in the source content, etc. In this regard, conventional techniques often require the maintaining of a repository of data model information and/or other stored metadata that can be referenced when accessing the various content sources and/or targets. But, among other things, the need for having metadata stored regarding each type of data source and/or data target prevents conventional techniques from processing arbitrarily complex data structures (e.g., multiple mixed MIME types in the same input) since such arbitrarily complex data structures would require metadata for numerous data/object types to be configured and stored in advance of the processing of the data. For similar reasons, conventional techniques may not be capable of processing complex data having corresponding metadata stored within, such as, for example, when some of the complex data does not include corresponding metadata.

Example embodiments of the invention provide a graph based declarative mapping technique that can efficiently and flexibly accept multiple sources of various MIME types as source information and generate one or more outputs that aggregate the source information as needed.

Certain example embodiments relate to a system for mapping from one or more source information sets to one or more target information sets. At least one memory stores a plurality of mapping ontologies each associating a first declarative expression with a first information set from which to read first information, and a second declarative expression with a second information set to which second information determined based upon the read first information is written. At least one processor is configured to perform operations comprising: generating a mapping graph having a plurality of nodes arranged according to an execution flow for obtaining the one or more target information sets, wherein at least some nodes of the plurality of nodes represent respective ones of the plurality of mapping ontologies; and generating the one or more target information sets, each of which includes information determined from the one or more source information sets, by traversing the mapping graph according to the execution flow.

Certain example embodiments relate to a method for mapping from one or more source information sets to one or more target information sets. At least one memory is provided, the at least one memory storing a plurality of mapping ontologies, each associating a first declarative expression with a first information set from which to read first information, and a second declarative expression with a second information set to which second information determined based upon the read first information is written. A mapping graph having a plurality of nodes arranged according to an execution flow for obtaining the one or more target information sets is generated by at least one processor communicably coupled to said memory. At least some nodes of the plurality of nodes represent respective ones of the plurality of mapping ontologies. The one or more target information sets, each of which includes information determined from the one or more source information sets, is generated by the at least one processor by traversing the mapping graph according to the execution flow.

Certain example embodiments relate to a non-transitory computer-readable storage medium having stored thereon computer program instructions that, when executed by a processor of computer having a memory which stores a plurality of mapping ontologies, wherein each stored mapping ontology associates a first declarative expression with a first information set from which to read first information and a second declarative expression with a second information set to which second information determined based upon the read first information is written, causes the computer to perform operations comprising: generating, by at least one processor communicably coupled to said memory, a mapping graph having a plurality of nodes arranged according to an execution flow for obtaining the one or more target information sets, wherein at least some nodes of the plurality of nodes represent respective ones of the plurality of mapping ontologies; and generating, by the at least one processor, the one or more target information sets, each of which includes information determined from the one or more source information sets, by traversing the mapping graph according to the execution flow.

According to certain example embodiments, a plurality of mapping resolvers is stored, each of the first and second declarative expressions being associated with at least one of the stored mapping resolvers for accessing one or more information sets, and the traversing includes, at respective nodes of the mapping graph, executing the corresponding resolvers to map information from a source one of the information sets to a target one of the information sets.

According to certain example embodiments, the mapping graph includes a plurality of nodes in which (a) the nodes representing ones of the plurality of mapping ontologies is a first set of nodes, (b) a second set of nodes represent respective conditional expressions, and (c) a connection between a first node and a second node of the plurality of nodes represent a respective parent-child relationship between the first node and the second node.

Input information sets may be arbitrarily complex in certain example embodiments.

Certain example embodiments relate to techniques for mapping from one or more source information sets to one or more target information sets. At least one memory stores a plurality of mapping ontologies and a plurality of mapping resolvers. At least one processor is configured to perform operations comprising generating a mapping graph in which (a) a first set of nodes from a plurality of nodes represent respective ones of the plurality of mapping ontologies, each mapping ontology associating a first declarative expression with a source information set and second declarative expression with a target information set, (b) a second set of the plurality of nodes represent respective conditional expressions, and (c) a connection between a first node and a second node of the plurality of nodes represent a respective parent-child relationship between the first node and the second node. Each of the first and second declarative expressions is associated with at least one the stored mapping resolvers for accessing the one or more source information sets or the one or more target information sets. The at least one processor is further configured to perform operations comprising generating the one or more target information sets, each of which includes information determined from the one or more input information sets, by traversing the mapping graph.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 3 is an ontology that can be used in the graph based approach to declarative mapping, in accordance with certain example embodiments;

DETAILED DESCRIPTION OF EXAMPLE EMBODIMENTS OF THE INVENTION

As described above, some conventional techniques lack certain characteristics that may be necessary for, or at least useful in, achieving the level of flexibility and efficiency demanded by many modern enterprise applications. For example, some conventional techniques may fail to provide all features required to map/transform contents of arbitrary complexity from heterogeneous systems to other independently structured content.

Certain example embodiments provide a declarative framework that has capabilities to process any input content source of any MIME type or composition of several MIME types with arbitrary structures and to generate content output result of any MIME type or composition of several MIME types with arbitrary structures. Certain example embodiments also support hierarchical conditional mapping for selectively processing part of a document based of various conditions. The source content and/or output result can be any sequence of content of several MIME types, a nesting of the content of one MIME type inside another, and/or any combination of aggregation and nesting. For example, content of an input source could be an aggregation of contents of MIME types m1 and m2 where the content of m1 type contains nested contents of MIME types m3 and m4.

Certain example embodiments provide all features required for mapping and transforming data of one MIME type or composite MIME type into other MIME types as defined through declarative ontologies in source to target semantics. An ontology, as referred to herein, is a naming and definition of the types, properties, and interrelationships of entities that exist for a particular domain. Declarative mapping ontologies are used in certain example embodiments to define the structure of source and target and their relationship. Consistent with a declarative programming paradigm, the mapping expressions may express the logic of a computation without describing its control flow. A graph model of an ontological representation is formed and then used to drive the mapping from source to target. A graph based execution paradigm is used in certain example embodiments to solve complex, hierarchical and/or conditional use cases that map content from one or more content sources to one or more targets. Both the model and the execution of the mapping and transformation utilize the graph as their core.

In example embodiments, mapping relationships are defined as atomic functions of a mapping, acting on the result of previously executed expressions and therefore providing for fine-grained mapping that is declarative and modular at the same time. When executing atomic functions, a system according to certain example embodiments helps ensure that the series of operations required for the atomic function either all or none occur. In other words, a complex relationship can be compositionally broken down to a series of basic expressions such that each basic expression represents an atomic function.

Certain example embodiments use common declarative "mapping expressions" for mapping and transforming Mapping expressions are a basic building block (i.e., a basic construct) of certain example embodiments. Various mapping expressions may operate in combination to perform mapping and transformation, as required. The mapping expressions are declarative in nature and are not bound to source or target. In other words, mapping expressions may be used independently of any particular position in the graph. This provides a powerful but flexible way to specify the logic of a mapping, e.g., without specifying execution/source/target details. In certain example embodiments, additional declarative mapping expressions may be added while the system is running (e.g., while transforming input information to target information is ongoing), and the system can dynamically update the mapping graph to incorporate the changes. Mapping expressions are not necessarily tied to any specific representational form. It thus will be appreciated that the representational form of mapping expressions presented here are examples of one form.

Certain example embodiments make use of "mapping ontologies" to control the mapping/transformation. A mapping ontology defines the ontological relationships between source and target using declarative mapping expressions. Any mapping expression can be used as either source or target, depending on the requirements. A source mapping expression is evaluated first to get/read the source value from a source information set, and then the target mapping expression is evaluated to set the source value to the target result (e.g., to write/assign the source value to the target result) of the target information set.

A "mapping rule" is an example implementation of a mapping ontology. Thus, although certain example embodiments are described in connection with mapping rules, other implementations for ontologies may be used instead of, or together with, mapping rules. Another example implementation of ontologies includes dynamic lookup. An ontological definition may be implemented, which causes evaluation of expressions resulting in dynamic lookups. The instant disclosure uses the example of mapping rules that may be used in place of mapping ontologies for simpler more clear explanation and example. In certain example embodiments, heuristics may be used instead of or in addition to rules as part of an ontology based technique to self-determine the structure and nature of the data.

Certain example embodiments support conditional mapping through the use of "conditional rules" that allow the processing of a set of mapping rules based on some condition. A conditional rule itself can use mapping expressions to define the condition. With the use of conditionality, a part of the content can be processed in a different manner or skipped based on some conditions, for instance.

Certain example embodiments may provide constructs to loop through content, filter content, and combine contents from multiple sources. Looping, filtering, and combining constructs themselves may use mapping expressions at its core.

Thus, there may be multiple types of mapping rules: simple mapping rules that map one or more input content sets to one or more output content sets; conditional mapping rules that enable different processing for parts of input content and/or different generation for parts of output; and loop mapping rules that provide for applying certain mappings to a sequence of input contents. Certain example embodiments allow nesting any type of mapping rule within any other type of mapping rule to easily handle nested/hierarchical content. This enables easy handling of nested and hierarchical sources and targets, for example.

The framework in certain example embodiments can efficiently process data from multiple systems and publish to multiple systems. This allows for aggregating content from multiple sources before processing and transforming that content and publishing the transformed content to multiple systems. In this way, multiple input sources automatically affect multiple target results through relationships defined using mapping rules/ontologies without the sources and the targets actually being made aware of each other. In other words, the content sources may be accessed without specifying information regarding the targets, and the targets may be accessed without specifying information regarding the content sources. This enables multiple independent sources/targets to be used in complex relationships through mapping rules, e.g., in order to process any complex structure of input source and target result.

Certain example embodiments make use of an "expression graph." Each mapping expression can be represented as an expression graph. The corresponding expression graph is traversed at runtime (e.g., dynamically, as the data arrives) to evaluate the mapping expression. The expression graph is a graph data structure that corresponds to a mapping expression. Each node in the graph corresponds to a sub-expression or operator. It encapsulates the execution flow, represents relationship information between sub-expressions, etc. An expression graph is created by parsing a mapping expression. Execution of a mapping expression is done by traversing the mapping graph dynamically during runtime as the data arrives, and populating values at each node with the use of mapping resolvers in certain example embodiments. The mapping resolvers, as also stated elsewhere in this document, may include pieces of programmed logic that resolve the individual expressions according to how the graph relates them.

Certain example embodiments also make use of a "mapping graph." For instance, certain example embodiments first create a mapping graph from a mapping rules set. Each mapping rule is a node in the mapping graph. Each mapping node itself is composed of expression graphs corresponding to respectively source and target expressions. At run time, the graph is traversed to perform the mapping/transformation. The mapping graph represents the relationships between expressions and resolvers' actions when the mapping graph is traversed, and the expressions processed will depend on the actual data being processed at the time (e.g., at runtime). Therefore, each different combination/mixed types of data can therefore be handled in example embodiments.

The above-described aspects provide for advantages in enterprise systems. Semantic independence of source and target expressions is one of the advantages. In this regard, the use of declarative mapping expressions enables semantic independence of source and target expressions. The source expression processes an input source without knowledge of a target expression. The target expression processes the target result(s) without knowledge of the source expression. The same expression can be used for either source or target; certain example embodiments can automatically get or set the content based on its usage. This enables using the same set of expressions in a variety of cases. For example, expressions to work on JSON content can be used for conversions between JSON and any other document structure, such as plain text, XML and protocol buffers etc.

The ability to chain mappings is another advantage. Because of semantic independence of source and target expressions, one or multiple sources can produce one or multiple targets as a result of mapping rules, which can then be used as sources in further mapping rules in a complex structure of source/target combinations. This enables chaining multiple mappings in a multi-stage manner to process a complex input source or target result of any structure and type. One example would be to first use expressions for XML content as source and expressions for JSON content as target to transform XML data to JSON data, then use expressions for JSON content as a source for a REST service invocation, to provide the transformed JSON content as web service input. (As is known, JSON (JavaScript Object Notation) is a lightweight data-interchange format, and Representational State Transfer (REST) is a distributed system framework that uses web protocols and technologies.)

Independence from metadata is another advantage. Because source and target expressions are independent of each other, no metadata information about how to transform source content into target content is needed in the input source. According to certain example embodiments, the declarative expressions may include information that help resolvers (e.g., simple code logic) to be coded in such a way as to determine (at runtime) what a thing (e.g., data source or target) is and how to interact with it. In addition, the resolvers can determine (e.g., heuristically) information (e.g., structure/type) at runtime. This is different from conventional techniques that are based on storing information associated with a particular source/target to describe the source/target (e.g., its structure/type etc.). Stored information describing the structure and/or other details of another data/object is commonly referred to as metadata. In example embodiments, the source expression "knows" how to extract data from the input source, and target expressions "know" how to create the target result with the appropriate source content. For example, the source mapping expression itself may include the information regarding the source data model as needed for accessing the content. This enables the use of many of the same set of mapping expressions in a wide variety of mappings. In this manner, while the expressions are independent, not just of each other but also of any metadata information, their resolution at runtime and execution on the fly makes the relationships necessary for interaction with data source and/or targets.

Still further, the extendibility of certain example embodiments and the ability to use multiple MIME-type content are also advantages of the subject conditions. As will be appreciated from the above, basic building blocks of certain example embodiments are mapping expressions, and support for new mapping expressions can be easily added, e.g., by adding new resolvers. A resolver may be configured so that it is able to handle specific expressions without any knowledge of where it might be used. A resolver, according to certain example embodiments, may be considered as being made of pieces of logic. Thus a resolver enables interpretation of an expression in entirely the way the pieces of logic operate—making them independent of any specific dependence.

Because of the usage of declarative mapping expressions and rules that are semantically independent of each other, multiple expressions that deal with data of, for example, different MIME-types and structures can be combined in certain example embodiments to efficiently handle data of multi-MIME types. Conditional and hierarchical constructs can be used to processes/create input source/target results that can be a combination of multiple MIME types.

Figure 1:
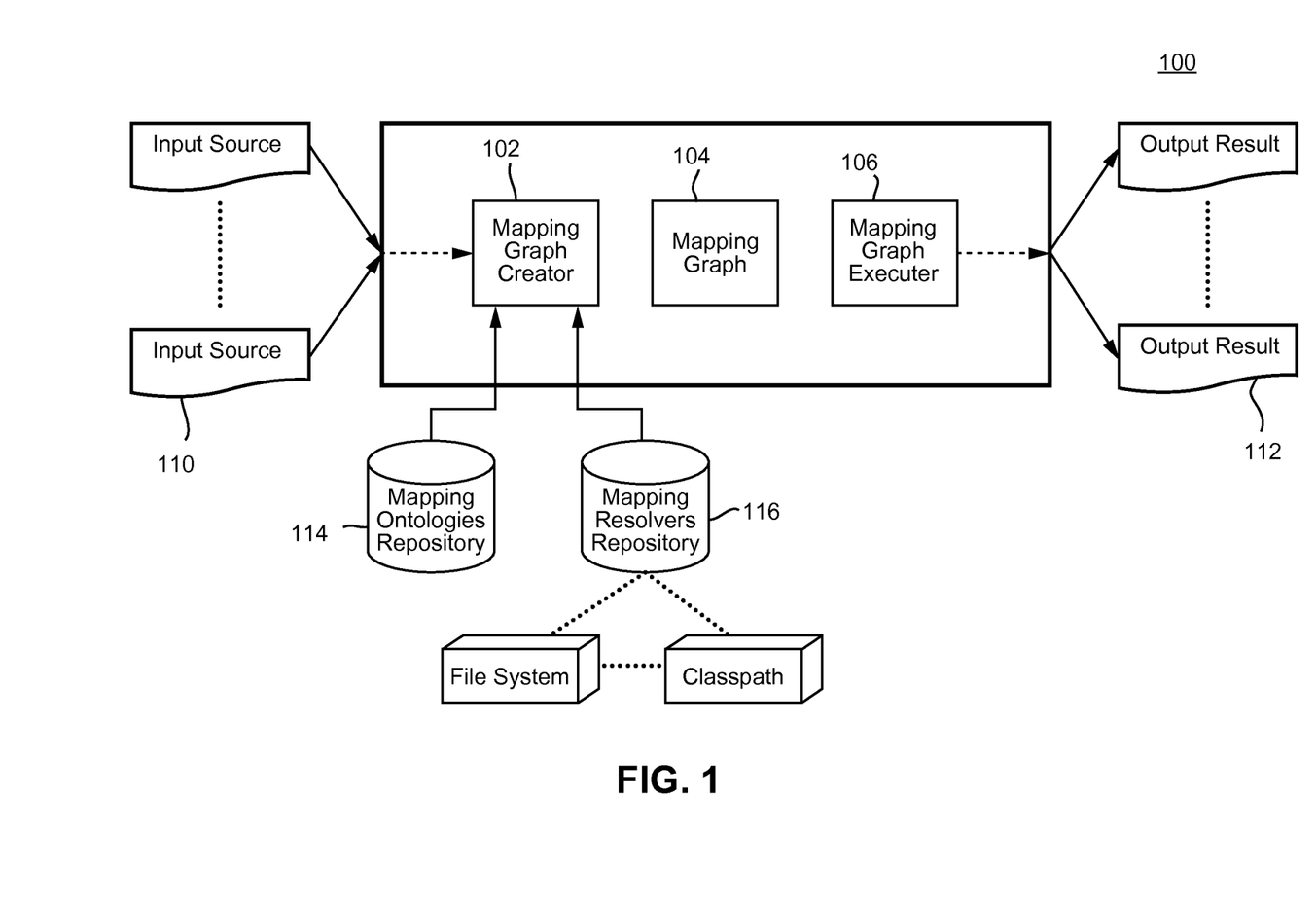
FIG. 1 is an execution environment for generating an output by using a graph based approach to declarative mapping, in accordance with certain example embodiments.

FIG. 1 is an example execution environment 100, according to certain example embodiments. A system, according to certain example embodiments, operate in two phases: a first phase 102 of mapping graph creation to generate the mapping graph 104, and a second phase 106 of mapping graph traversal. The mapping graph 104, as noted above, is a graph data structure that encapsulates execution flow for obtaining target data from source data, nodes in execution, and relationships of each node. Nodes of the mapping graph 104 correspond to mapping rules. Each node in the mapping graph (sometimes referred to as node or rule node) is further composed of separate expression graphs corresponding to source and target expressions.

In the mapping graph creation phase 102, a mapping graph creator process can be used to scan/parse all or substantially all mapping ontologies (mapping rules) and create a graphical data structure that encapsulates execution flow, nodes in execution, and relationships between nodes. Nodes of the mapping graph 104 correspond to mapping rules. Each rule node further refers to separate expression graphs corresponding to source and target expressions. The mapping graph creation phase 102 may utilize a mapping ontologies repository 114 and a mapping resolvers repository 116.

The mapping ontologies repository 114 is a repository of mapping ontologies. In the illustrated example embodiment, the mapping ontologies repository 114 is a repository of mapping rules.

The mapping resolvers repository 116 is a repository of mapping resolvers. Mapping resolvers in certain example embodiments define how a node in the mapping expression graph is evaluated. Mapping resolvers are used during graph traversal of an expression graph to evaluate a node. Resolvers are defined to resolve an expression on a parent object to a result value and/or to set a value on a parent object for a mapping expression. For example, a resolver can be written to get and set a value in a dictionary. The resolver may check if a parent object is of type dictionary, and if so use a sub-expression as the key in a dictionary to return the corresponding value. Similarly, for setting the value, the resolver can check that the parent object is a dictionary, the sub-expression is the key, and the value passed for setting is the value corresponding to the key. In contrast to conventional techniques that use metadata stored separately from the data source, in example embodiments, the information necessary for the operation of the resolver is retrieved either from declarative expressions or heuristically from the data itself or a combination of both. Accordingly, certain example embodiments may not, and are not required to, keep any metadata separate from the data. In the above example of a dictionary resolver, the system uses expressions as well as heuristics to determine if the data it is working on is indeed in the dictionary. If the data is not found in the dictionary then another resolver that is able to handle the data of that type in context of the expression may take over and resolve the expression properly.

At runtime execution, the mapping graph 104 created in the previous phase 102 is traversed to evaluate all the mapping rules and expression graphs included in the mapping graph 104 to perform mapping from the one or more input sources 110 to the one or more target results 112.

The inputs 110 and the outputs 112 may be of any MIME type or combination of any MIME type, and may be of arbitrary structure. Any of the inputs 110 and outputs 112 may be residing on the same or different computing platforms than the platforms on which the mapping occurs. In certain example embodiments, at least some of the inputs 110 are accessed from a Big Data source. The outputs 112 may be a data structure for display, for further processing, and/or output in another manner. The mapping ontologies repository 114 and mapping resolvers repository 116 may be stored in local memory and/or external memories.

A description of certain aspects of syntax and implementation details is provided for illustrating how certain example embodiments may operate. It will be appreciated, however, that the symbols chosen to represent the syntax of an expression in the following descriptions are examples and should not be construed as limiting.

Mapping expressions are basic building blocks of certain example embodiments. Mapping expressions are declarative and are not bound to either source or target. An example format of a mapping expression is as follows: ${some.expression}

If mapping expression is specified without ${ }, then it can be treated as a literal expression that evaluates to the specified text. A literal expression can also be specified inside a non-literal mapping expression using single quotes ('). Sub parts of a mapping expression are separated using period or dot (.).

For example, ${json.employee.name} gets or sets name of employee JSON object. "com.example.employee" provides a literal expression that evaluates to text "com.example.employee".

Square brackets ([and]) may be used to define a sub expression that is independently evaluated and the result of which is used for execution of the parent expression. An example format is ${expr1[expr2]}. In this example, expr1 is evaluated first and then expr2 is independently evaluated. Then, the result of expression expr2 is evaluated against expr1.

Consider, for example, ${json.employees[xml.emp.name]}. The expression json.employees is evaluated first to a JSON object that contains multiple JSON employee objects. The expression xml.emp.name is then evaluated to some employee name. Then, the returned name is evaluated against the employees object to get a JSON object specific to an employee.

In ${json.employees['john']}, the expression 'john' is a literal expression that evaluates to text "john", which is then used to get the JSON object for john named employee.

Certain example embodiments also support functional mapping expressions. Functional mapping expressions are like stateless functions that work on the input parameters and return results. For functional expressions, expressions corresponding to parameters are evaluated first, and then their results are used as input. An example format of a functional expression is ${func1(expr1, expr2)}. Here, expr1 and expr2 are evaluated first and then their results are used to evaluate func1. An example is ${BinaryEncode ('Base64', zip.file1)}.

Mapping rules are defined in terms of source and target semantics using mapping expressions. An example format of a mapping rule is as follows:
<rule source="${SourceExpression}"target="${TargetExpression}"/>

Any mapping expression can be used as either source or target depending on the requirements. First, the source expression is evaluated to get the source value. Then, the target expression is evaluated to set the source value to the target. Source and target mapping expressions are de-coupled from each other and can be used independently of each other with other expressions. An example of a mapping rule is:
<rule source="${xml.employee.name}"target="${json.employee.name}"/>

The mapping rule gets the name of an employee from an XML document and sets the name to a JSON document. The source and target expressions are de-coupled from each other. The source expression "knows" how to get/set a node from/to XML content, and the target expression knows how to get/set a field from/to a JSON document. Together, they are used to get the employee name from an XML document and set it to a JSON document. They can be used in reverse to get the name from a JSON document and set it to an XML document:
<rule source="${json.employee.name}"target="${xml.employee.name}"/>

The source and target mapping expressions can easily be combined with other expressions to work with other content types.

Mapping rules can also be nested inside other mapping rules to create/process hierarchical data. Child rules are always executed before a parent rule. For example:

```
<rule source="${json.employee}" target="${json.employees.details}">
  <rule source="My Name" target="${json.employee.name}" />
  <rule source="email@example.com" target="${json.employee.email}" />
</rule>
```

Child rules are executed first to populate the JSON employee object with a name and email address. Then, the parent rule is executed to add the employee object to the details field of the employees object.

A mapping rule can also contain multiple targets so that result of source expression is mapped to multiple targets. This functionality can be used for logging and monitoring purposes, e.g., by adding extra targets to publish information to monitoring tools. For example:

```
<rule source="${json.employee.name}" target="${xml.employee.name}, ${dashboard.publish}, ${log.info}" />
```

In the above example, the result of the source expression is mapped to an XML target, published to dashboard, and logged at a predetermined level (e.g., INFO level).

Certain example embodiments also support specifying named contexts on mapping rules to explicitly pass information to child mapping rules. A context may be specified in terms of mapping expression. A named context may be available to only the current rule and child rules. A rule can specify multiple named contexts. The following syntax may be used to define named contexts:

```
<rule source="" target=""
  context="contextName1::${contextExpression1},
  contextName2::${contextExpression2}" />
```

The named context is evaluated before execution of child rules. The named context can be used in the following way to get the value from it:

```
<rule source="${context.contextName}" target="" />
Or
<rule source="${context['contextName']}" target="" />
```

Certain example embodiments provide conditional rules using mapping expressions which evaluates to boolean values. The following format may be used to define conditional rules:

```
<if expression="${expr1}">
  ...
</if>
<elseif expression="${expr2}">
  ...
</elseif>
<else>  ...
</else>
```

There can be multiple <elseif>, although the <elseif> and <else> may be optional. The conditional expressions are evaluated in order until one evaluates to true. Once a conditional expression is evaluated to true, its child rules are executed. Conditional rules are always executed before their children. Conditional rules can also be nested within other rules.

For-each mapping rules (also called loop rules) are specified by a named context which contains ".each" expression fragment. The ".each" expression fragment denotes that current rule and its children need to be executed repeatedly over a collection or iterator. The format of loop rule may be:

```
<rule source="" target="" context="c::${expr1.each}" >
...
</rule>
```

Here, the named context "c" is specified with a ".each" expression. This means that the evaluation of expr1 returns a collection or iterator. The current rule and its children are executed for every element of the iterator or collection. The current element of collection or iterator is available as named context "c". If expr1 does not return a collection or iterator, then the current rule and its children are executed only once.

There may be any of several types of nodes in the mapping graph (e.g., mapping graph 104): a rule node, a conditional node, and a for-each node (also called a loop node).

A rule node in the mapping graph is a node corresponding to a mapping rule. There will be a rule node for each mapping rule in the rule set. Child mapping rules of a parent mapping rule are added as children nodes in the mapping graph. A rule node itself is composed of expression graphs corresponding to source and target mapping expressions.

A conditional node in mapping graph is a special node that directs the graph traversal to one of the branches based on the evaluation of conditional expressions. The node is composed of several expression graphs corresponding to each conditional expression.

A for-each node is a special node in mapping graph that re-directs the flow of graph traversal to evaluate associated mapping rule and its children multiple times based on the corresponding loop variant. The loop variant may be a mapping expression that evaluates to a collection or iterator.

The mapping graph creation can be performed by scanning and parsing all the mapping rules and adding them into the mapping graph. A mapping expression is first categorized into a conditional rule or a mapping rule while parsing it.

For a conditional rule, a conditional node is added in the mapping graph under the corresponding parent node. All associated conditional expressions are then parsed to create expression graphs that are then associated to the conditional node. Child mapping rules then are processed next and added as child rules to the conditional node.

For the mapping rule, a rule node is added in the mapping graph under the corresponding parent node. Source and target expressions are then parsed to create expression graphs and associated to the rule node. If the mapping rule defines any context, then those context expressions are parsed into expression graphs and associated to the rule node.

At the ending of the step, a mapping graph is created with rules as nodes. Type of nodes, the relationship between them, and annotated information defines the flow of the graph traversal. Annotated information points to the capability provided by the system to add custom information that can drive the execution/traversal of graphs. The system may use annotated information to guide the looping behavior (e.g., annotate the node and edge to mark the start of loop node, specify the expression which provides the loop variant), specify the expression used to pass explicit information to children nodes using named context, etc.

In the graph traversal phase, the mapping graph is traversed to evaluate all the rules and expressions to perform mapping from input source to target result. The traversal starts at the root of graph, which is the parent of all rule nodes. The traversal is performed in a depth-first manner in certain example embodiments.

If a rule node contains any children, then children are traversed and executed first before the parent rule is executed. After all children of a node are executed, the source expression is executed first to get the source value. Once the source value is obtained, the target expression is evaluated with the source value to set the target content.

As part of runtime execution, nodes of the mapping graph contain NodeLocal, which can be considered a concept similar to ThreadLocal. The variables available in NodeLocal are limited to the node itself and its children. The NodeLocal of a node is initialized just before it is visited. If a rule defines a named context, then all the named context expressions are executed before source and target expression execution. Values of named contexts are stored in NodeLocal of current node.

Evaluating an expression involves traversing its expression graph and getting/setting value for each node. The traversal of an expression graph is done in a breadth-first manner in certain example embodiments. Graph traversal starts at the root node of an expression graph. The current node is executed first before the children nodes are visited. Execution of an expression node results in an object that could either be the result of expression evaluation or an intermediate object for further evaluation. Executing an expression node involves evaluating the current expression fragment against the parent node object. Evaluation of the expression is handled by a set of resolvers that evaluates a given expression against an object. A resolver to handle an expression is dynamically picked based on the source object and expression to resolve, in certain example embodiments. Resolvers can easily be added and discovered for any type of custom expressions. These resolvers are available to all the nodes of expression graph. Furthermore, a node can reference any resource discovered anywhere in the graph. Thus, the execution of an expression is a dynamic process that depends on the type, content, and structure of the source. This allows the use of multiple data sources with different types of data simultaneously during execution.

For a conditional node, all conditional expressions are executed in ordered manner until one is resolved to true. If no expression is resolved to true, traversal of that node ends here and children nodes are ignored. Once a conditional expression is resolved to true, its corresponding children are traversed for execution in a depth-first manner in certain example embodiments. A conditional expression itself is resolved by traversing its expression graph as detailed above.

For a node with looping behavior, a named context with a for-each expression is evaluated first. The current node and its children are executed repeatedly until execution of the for-each expression returns a valid next value. A for-each expression generates separate expression graphs with appropriately annotated loop edges to guide the traversal of expression graph for the next execution. Looping nodes can be nested to any level. A mapping rule can contain a multiple for-each named context. In case of a multiple for-each named context, all named context must evaluate to a valid next value for the current node and its children to be executed.

During traversal, if a mapping rule produces an error, the node and its children are skipped and the error is stored to make it available after the current execution ends.

Certain example embodiments allow dynamic updating of the mapping graph for a running system. The system is capable of managing multiple versions of mapping graph. When a mapping graph is changed and provisioned, the system creates a new version of graph and tags it with version information. Any new execution of the mapping graph (e.g., new input arrives) uses the new version of the graph. If a graph is already being executed against some input, it will continue to use the same version of mapping graph until it is completed. Thus, concurrent traversals on different provisioned graphs are possible, and are accomplished without conflicts. If a use case needs mutations to the same mapping graph (and not the versioned approach), segments of the graph can be re-loaded using locking mechanisms so the dynamic nature is not limited to just a versioning approach.

This dynamic update capability is very powerful and allows parts of the graph to be updated (without conflict/inconsistences to the processing of the input/source to the target) while other parts are completely unaffected. In a complex system processing vast amounts of inputs/sources that are constantly arriving and producing/updating targets, it may be desirable for the system to remain running and, for example, an end-user dashboard target be uninterrupted by an update to another part of the graph that would have no relevance to the target dashboard.

Certain example embodiments allow easy real-time monitoring and logging by adding extra targets to mapping rules or adding new mapping rules just for logging and monitoring. Certain example embodiments support an easy to use graphical user interface (GUI) to visualize, monitor, and administer the mapping graph.

The GUI provides a visualization of a selected part or the entire mapping graph with each node corresponding to a respective mapping rule. The graph displays the relationship between any two nodes. The GUI can also display details of a mapping rule node, such as source expression, target expression, and expression graphs.

The GUI allows monitoring the flow through the mapping graph. It also allows monitoring individual mapping node. The GUI allows configuring any mapping node to automatically log its result or send it to some dashboard or generate reports. Certain example embodiments also provide capabilities for logging and monitoring through its extendable mapping rules. A new target or mapping rule can easily be added for logging or reporting a result. The GUI automatically creates appropriate rules for logging and monitoring.

The GUI also allows for creating or updating the mapping graph. The GUI allows for adding new node, deleting node, updating expressions of node, add/delete of conditional expressions, modifying relationships between nodes, and provisioning, etc. The GUI makes it easy to update the mapping graph and to monitor it in real time. The GUI may display the mapping graph and/or expression graphs in a manner similar to that shown in FIG. 4.

Figure 2:
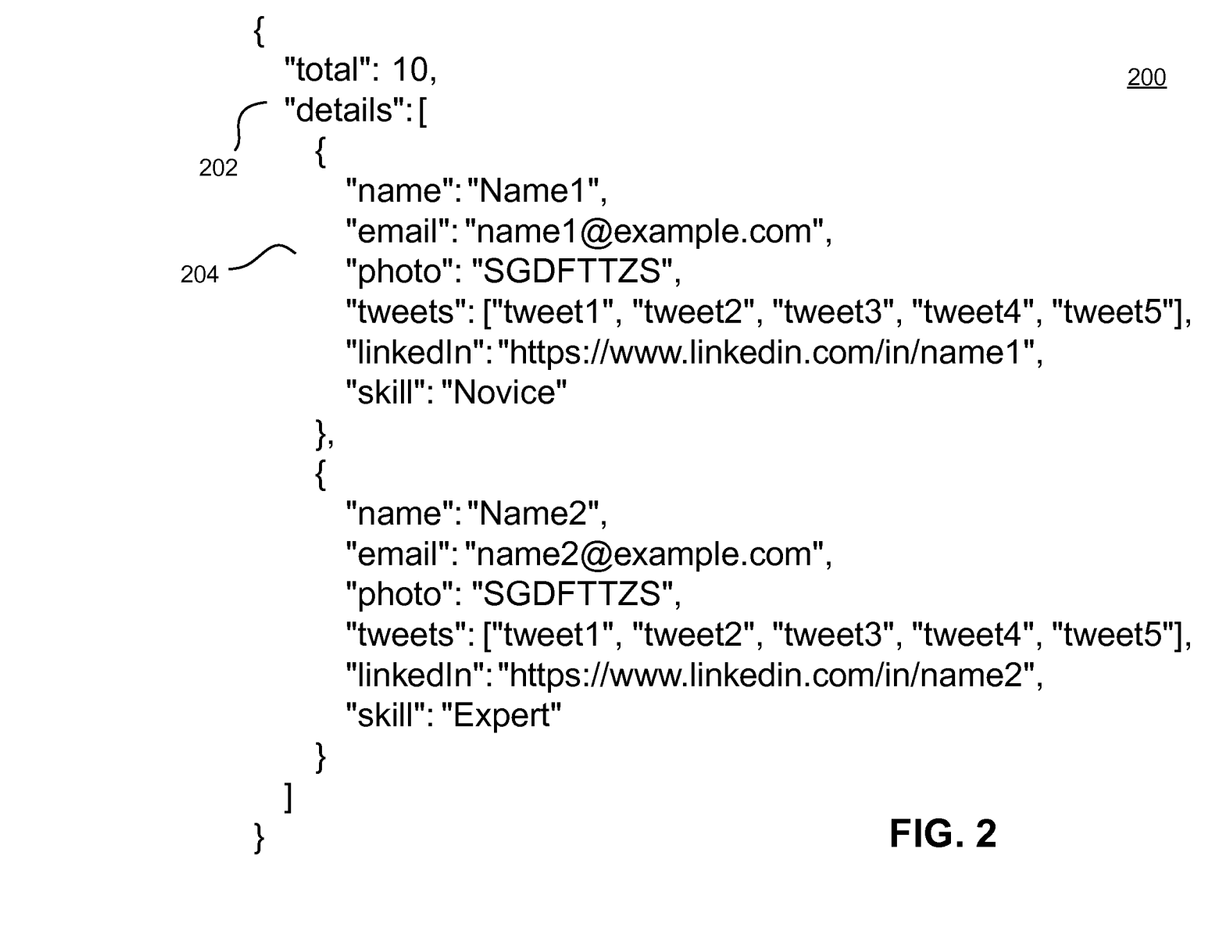
FIG. 2 is a structure of an output that can be generated by the graph based approach to declarative mapping, in accordance with certain example embodiments.

FIG. 2 illustrates an example content output 200, where employees' information is populated for an HTTP response. The response is JSON content aggregated from various different sources. Personal information such as name, email, etc., is fetched from a database. A photo of the employee is fetched from an FTP directory and encoded in text using base64 encoding. The LinkedIn profile and last five tweets from the employee's Twitter account are picked up based on email address. This information is populated in a section 204 for each employee to be listed, under details 202.

FIG. 3 illustrates an example of response JSON document 300. The mapping rules shown in FIG. 3 can be used to obtain all the source content and aggregate them into the target JSON document (e.g., output shown in FIG. 2). Details of the mapping rules are provided below.

Rule rule0 is the top level conditional rule. This rule has two child rules, namely, rule1 and rule16. The rule checks that 'employeesDetails' is the HTTP operation. The child rules are evaluated only when a conditional expression of this mapping rule is evaluated to true. The "http.header ['operation']" portion of the expression result in HTTP operation for which this mapping is performed, which is then compared with "employeesDetails" value.

Rule rule1 is the rule responsible for creating the JSON document with all the employees' details and mapping it to body of the HTTP response. This rule has two immediate children, namely, rule2 and rule3. The execution of rule rule2 happens only after all its children are executed. So the order of execution is rule2, rule3 and rule1.

The source expression "${json.employees}" of the rule evaluates to a JSON document with all employees' details. The expression looks for an employees JSON document in the current execution context and returns it. The JSON object is already created and populated by child rules of the rule rule1, which gets evaluated before it.

The mapping rule has two target expressions "${http.body}" and "${log.info}". The target expression "${http.body}" sets the content returned by the source expression to the body of the HTTP response. In this case, the JSON document with all employees is set to the body of the HTTP response. The target expression "${log.info}" logs the result of source expression at the INFO level. Similarly, other target expressions can be added to push the result of source expression to monitoring and reporting systems.

Both the source and target are independent of each other. The source expression just "knows" how to get a JSON object, and the target expression "knows" how to set the HTTP body. They can be used independently of each other. For example, the source expression can be changed to return XML document, which can then be set to the HTTP body.

Rule rule2 is used to set the total number of employees in employees JSON document. The count is calculated from database.

The source expression "${db.employees.count}" evaluates to the total row count in the employees table. The source expression here connects to the default database already configured with the system. Multiple databases can easily be configured and used in source expressions. The behavior and mapping expressions used are easily configured by adding new resolvers for mapping expressions.

The target expression "${json.employees.total}" sets the count returned by source expression to the "total" field of employees JSON object.

Like in rule rule1, the source and target expression in rule rule2 are independent of each other. The source expression "knows" how to get the count of a table, and the target expression "knows" how to set a field of a JSON document. Any expression can be replaced by another based on the requirement.

Rule rule3 is responsible for aggregating details of each employee into the employees object of JSON format. This is a looping rule. The rules get details of all employees from database, and loop through all the employees, create a JSON object for them, and append them to the details field of the employees object. The loop variant is defined here by the named context "emp::${db.employees.all.each}". The ".each" at the end of the expression denotes that current rule and all its children must be evaluated for each employee. The emp context has value of single different employee for each iteration of loop. The other context "photo::${ftp.get ['emp_data'].files.filter[type='png']}" contains the same value for each iteration of loop. The execution happens in following order for each iteration of loop:

Context emp is evaluated to points to next employee detail from db;
Context photo is evaluated;
All child rules are executed;
The source expression of the current rule is executed; and
The target expression of current rule is executed.

The source expression "${json.employee}" is a simple expression that returns the employee JSON object. The JSON object is created and populated by child rules. For each iteration of the loop, a new employee JSON object is created with information of the next employee. The target expression "${json.employees.details}" is a simple JSON expression that appends the JSON object returned by source expression into the details list of the employees JSON object.

The context expression "emp::${db.employees.all.each}" creates a named context that contains a single employee information for each iteration of loop. The part of the expression "db.employees.all" returns either a collection or iterator on which looping is done.

The context expression "photo::${ftp['emp_data'].filter [type=='png']}" creates a named context, which gets the "png" files from a FTP directory.

Rule rule4 sets the name of current employee in the employee JSON object. The name of employee is extracted from named context "emp", which holds details of an employee from the database. The source expression "${context['emp'].name}" gets the "emp" context then get the name from it.

The target expression "${json.employee.name}" sets the name returned by the source expression on the current employee JSON object.

Rule rule5 gets the email of current employee from context "emp" and set it to the current employee JSON object.

Rule rule6 gets the photo of current employee from named context "photo", encodes it using base64 scheme, and sets it to photo field of current JSON employee object.

The source expression "${base64Encode(context ['photo'][json.employee.name])}" uses thr functional expression base64Encode to perform the encoding. The base64Encode works on top of binary data and returns the encoded data in base64 scheme. Sub expression "context ['photo'][json.employee.name]" is evaluated first, which returns the photo of the current employee being processed. Functional expression base64Encode is then executed on the returned photo. The target expression "${json.employee.photo}" simply sets the encoded photo content returned by source expression to the photo field of current JSON employee object.

Rule rule7 sets the last 5 tweets from employee on the tweets field of current JSON employee object. The source expression "${twitter[json.employee.email].stream['5']}", gets the twitter stream linked to the email address of the current employee and picks the 5 recent tweets.

Rule rule8 gets the link to LinkedIn profile of the employee based on its email and sets it to the linkekdIn field of the current JSON employee object.

Rule rule9 sets the skill of the employee out of three options, namely, Novice, Proficient, and Expert. The source expression "${var['skill']}" gets the skill level from the variable skill. The skill level is stored by the child rules in the variable "skill".

Rules rule10, rule11, and rule12 form conditional rule set. Each rule has at least one child rule. Which child rule gets executed depends on which conditional expression evaluates to true. The rule rule10 gets the experience of the current employee and check if it is less than 3 years. The rule rule11 checks if the experience is greater than 3 years but less than 10 years. The rule rule12 automatically evaluates to true if both rule10 and rule11 evaluates to false.

Rules rule13, rule14, and rule15 set the value of variable "skill" as the source expression. The source expressions of these rules are literal rules that evaluate to the source string.

The mapping rules (and, for example, contexts found in the mapping ontology) are parsed and a mapping graph is created. The mapping graph 400 shown in FIG. 4 may be created for the example mapping rules 300. According to certain example embodiments, the process of flowchart 500 shown in FIG. 5 may be used to create the mapping graph 400 based upon the mapping rules 300.

Figure 4:
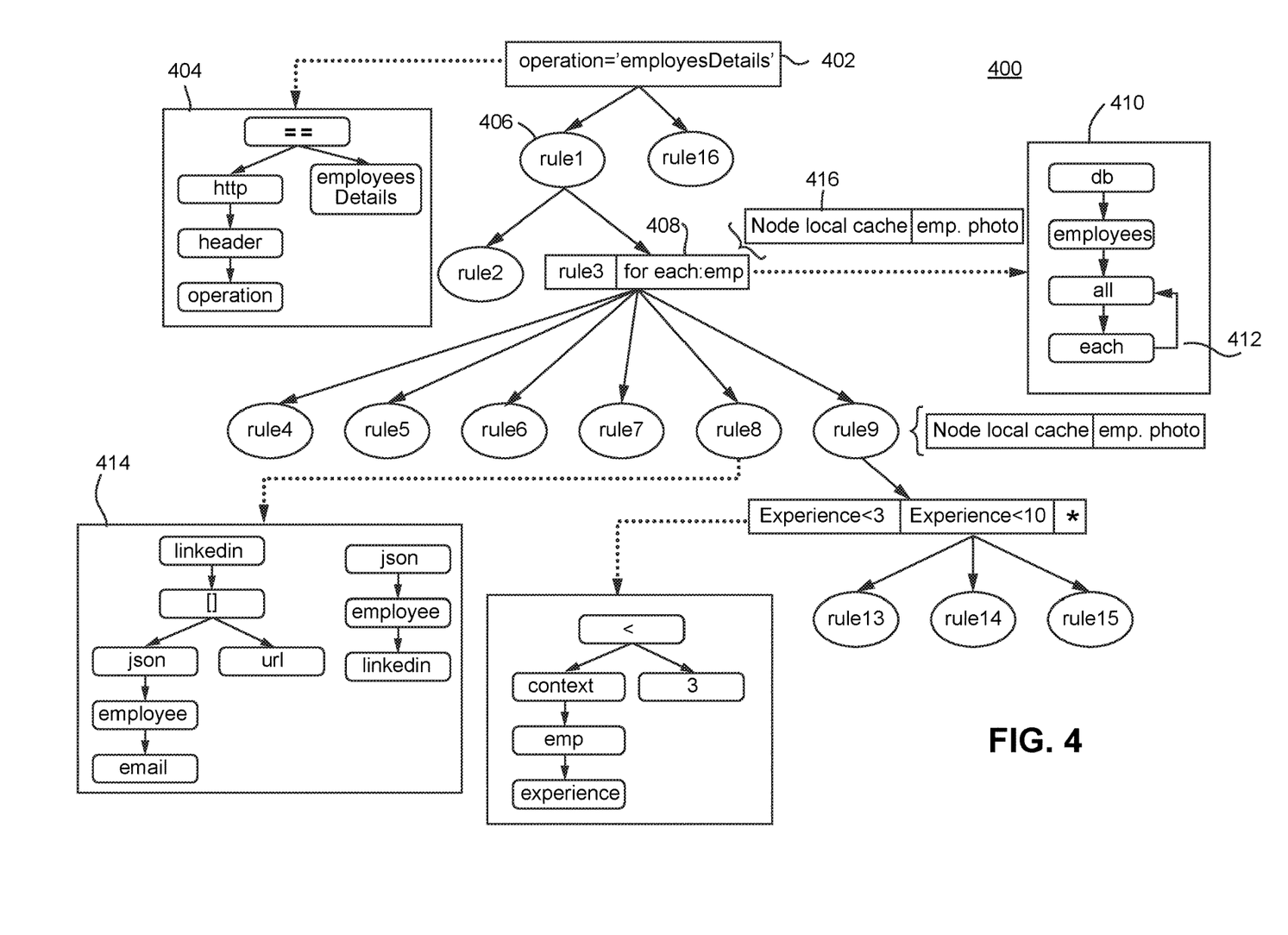
FIG. 4 shows a mapping graph and expression graphs associated with some nodes of the mapping graph, in accordance with certain example embodiments.
Figure 5:
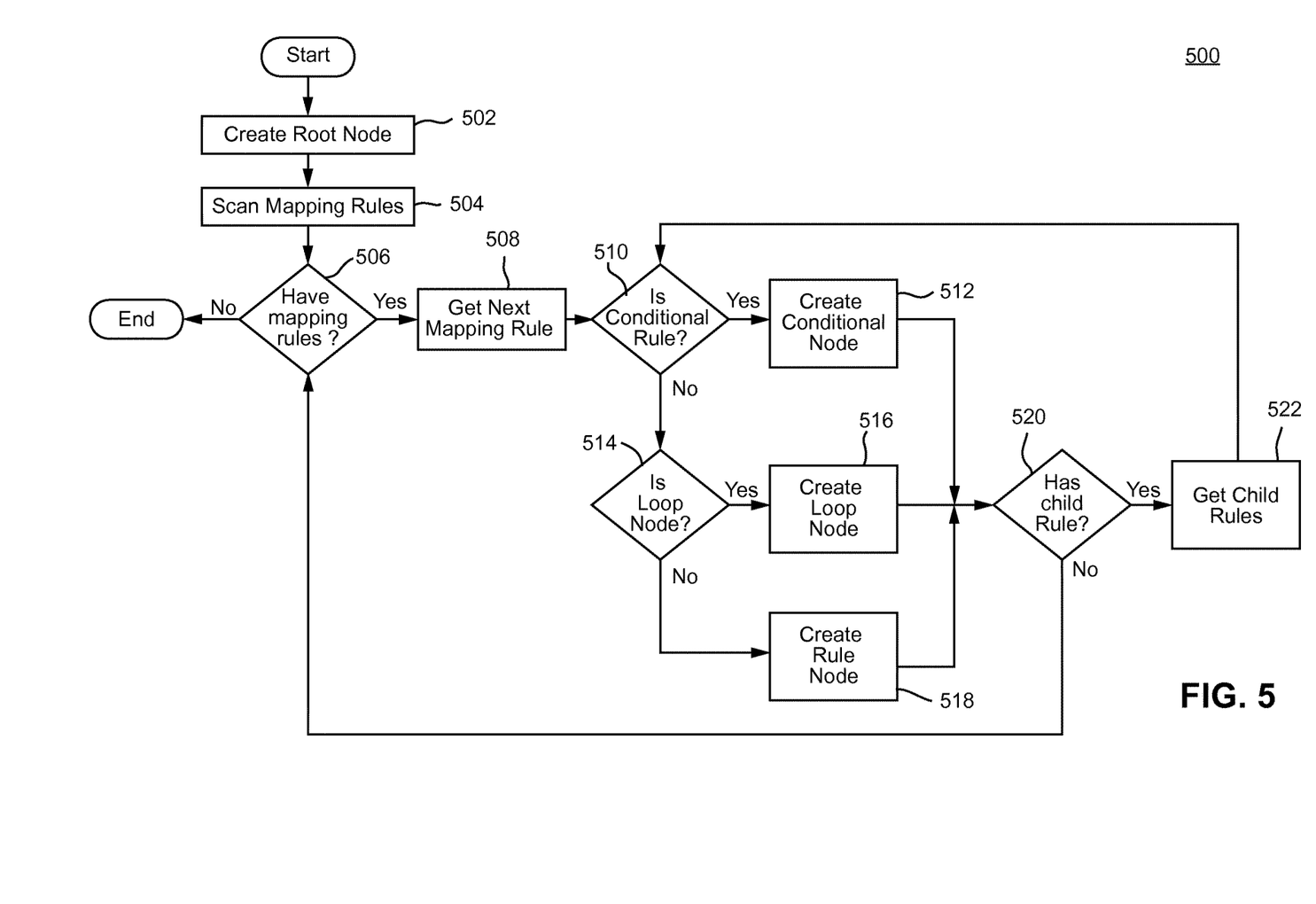
FIG. 5 is a flowchart illustrating a technique for creating the mapping graph in the graph based approach to declarative mapping, in accordance with certain example embodiments.

After entering process 500, at operation 502 the root node in the graph is created. First mapping rule rule0 is parsed. The rule rule0 is identified as conditional rule, and a corresponding conditional node 402 is added in the graph 400. The conditional expression of the rule is also parsed to create expression graph 404 associated with this node 402. The expression graph associated with rule0 is shown in the FIG. 4. The expression graph shows that it compares the result of its two children for equality.

At operations 504 and 506, mapping rules are scanned for, and it is determined that mapping rules are available. At operation 508, the next mapping rule is determined. For example, after rule rule0, rule rule1 is parsed. At operations 510 and 514, it is determined that rule rule1 is not a conditional node nor a loop node, respectively, and at operation 518, corresponding node 406 is added into the mapping graph as child of rule rule0 node. At operation 520, it is determined whether any child node is available, and at operation 522 rule rule2 is submitted to be added to the mapping graph at operation 518 after operations 510 and 514. A node for rule rule2 is created as child of rule rule1.

The rule rule3 is parsed and identified as loop node. The node 408 corresponding to it is added in the mapping graph as a child of rule rule1. This may be performed in accordance with operations 514 and 516 of process 500. The node is annotated to have named node local context emp and photo. The node is also annotated with the named context which provides the loop variant. The expression graph 410 corresponding to named context emp is described above. The expression graph shows the loop 412 between its nodes. 416 indicates the NodeLocal context associated with rule rule3.

Similarly rules rule4, rule5, rule6, rule7, rule8, and rule9 are parsed and added as child nodes of rule rule3 in the mapping graph. In FIG. 4, the expression graphs 414 (a source expression graph and a target expression graph) generated for rule rule8 is illustrated. Rule rule9 may be detected by the process 500 as a conditional node at operation 512 and added as such to the mapping graph 400. The source and target expression graph corresponding to rule rule7 is shown in the drawings.

The rules rule10, rule11, and rule12 are parsed and added as single conditional node in mapping tree as child of rule rule9. The conditional node has associated expression graphs for each conditional expression. An expression graph corresponding to one of the conditional nodes is shown. The rules rule13, rule14, and rule15 are parsed and added as child nodes of single conditional node.

Figure 6:
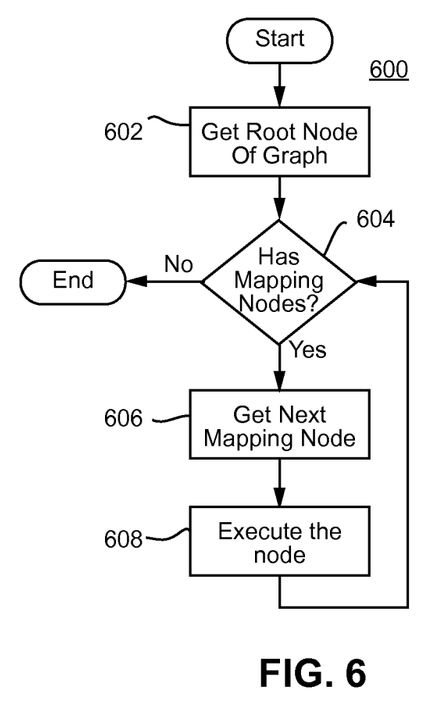
FIG. 6 is a flowchart illustrating a technique for traversing the mapping graph, in accordance with certain example embodiments.
Figure 7:
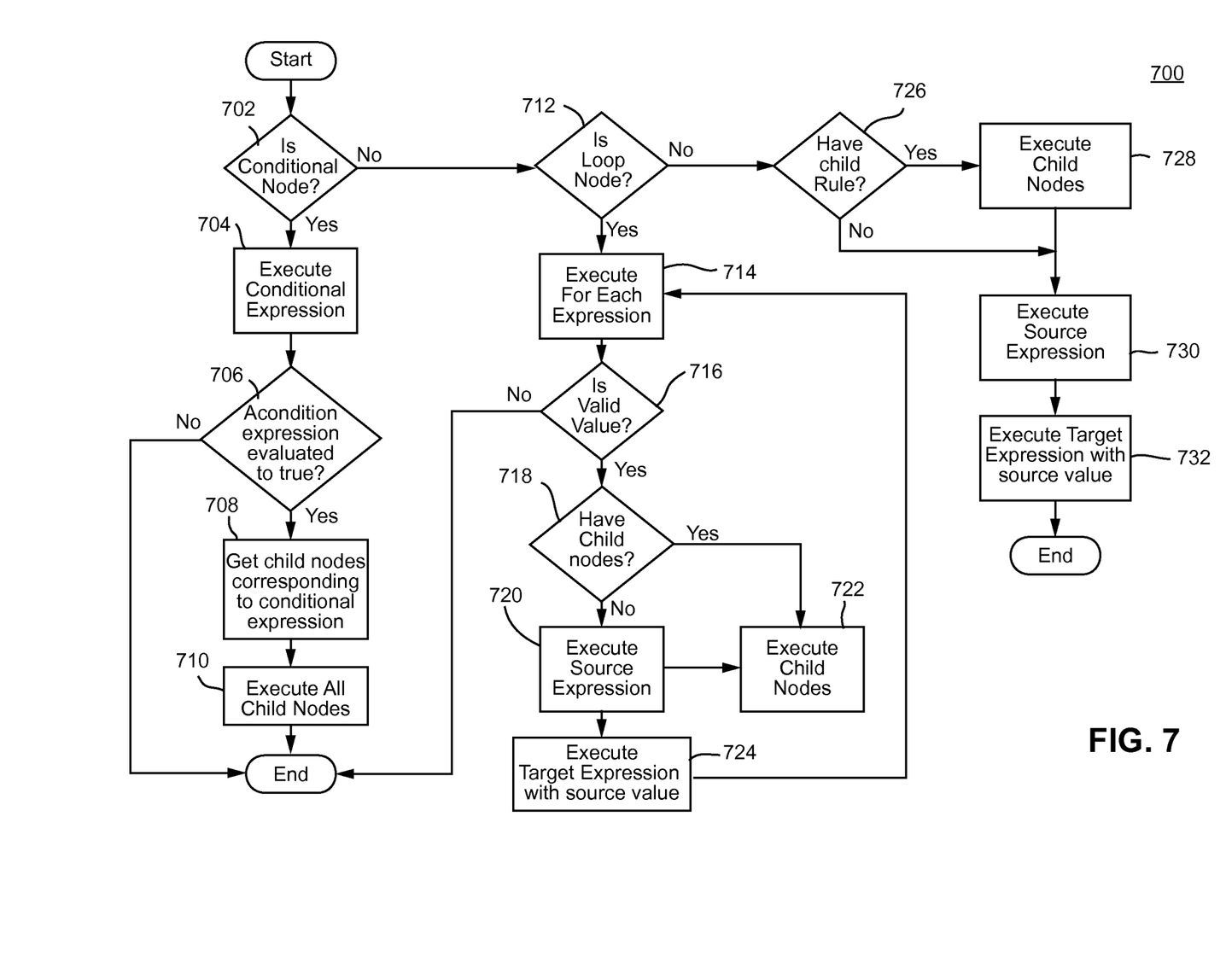
FIG. 7 is a flowchart illustrating a technique for executing node in the mapping graph, in accordance with certain example embodiments.

The execution of mapping rules is performed by traversing a mapping graph. FIG. 6 is a flowchart of an illustrative process 600 for traversing a mapping graph, such as mapping graph 400, according to certain example embodiments. After entering process 600, the root node is identified at operation 602. Thus, the traversal starts with the rule rule0 node. Flowchart 700, shown in FIG. 7, illustrates a process for executing a node in the mapping graph, according to certain example embodiments. Thus, because the rule0 node is a conditional node, the conditional expression is evaluated before traversing any child. The children of the rule0 node are traversed only if the conditional expression is evaluated to true. The expression graph corresponding to the rule0 node is evaluated by traversing the expression graph. While traversing the expression graph, the current node is evaluated first, before moving on to child nodes unless the current node is functional expression or operators. First, the '==' node of expression graph is traversed. The '==' requires both of its children to be evaluated before comparing them. The right child of the '==' is a literal expression that simply evaluates to 'employeeDetails'. The left child of '==' is evaluated by traversing the left tree. First the 'http' node is traversed. The traversal to 'http' node evaluates to a data structure that contains the information corresponding current http request. The exact data structure used is implementation dependent and can be updated by adding new resolvers for HTTP expression. After that, the 'header' node is traversed. The traversal of 'header' node extracts the information regarding header from the HTTP information data structure from parent node. After that, the 'operation' node is traversed. The traversal of operation node extracts the operation information from the header information data structure of the parent node. After that, the operation returned by left child traversal of the '==' node is matched to the string literal returned by right child. If both match, then child rules are traversed; otherwise, traversal ends here. The above described processing in relation to the conditional rule0 node corresponds to operations 702-710.

After the traversal of the rule0 node, in accordance with operations 604-606, the rule1 node is traversed. At operation 608, the rule1 node is executed in accordance with process 700. Because the rule1 node is a simple node (e.g., not a conditional node, nor a loop node), process 700 proceeds to operation 726. At operation 726, it is recognized that the rule1 node has child nodes. At operation 728, a first one of the child nodes is executed. Thus, the rule1 node is a node whose traversal finishes only after all its children are traversed. After all its children are traversed, its source and target expression are evaluated at operations 730 and 732 respectively, and traversal of this node finishes.

The first child of rule1 node, the rule rule2 node is traversed next (i.e., before traversal of its parent rule1 node is completed). The rule2 node does not have any child nodes so traversal of it finishes by traversing source and target expression graph. For example, when process 700 is entered in executing the rule2 node, process 700 proceeds to operation 726, and detecting that the node has no child nodes, directly proceeds to operations 730 and 732 to execute the source expression (i.e., "${db.employees.count}") and target expression (i.e., "${json.employees.total}"), respectively. The traversal of the corresponding source expression graph starts with traversal of node 'db'. The traversal of the 'db' node evaluates to the information of the database configured. The 'employees' node in the source expression graph is traversed next, and it evaluates to the information of employees table in the database. The 'count' node is traversed next, and it evaluates to the row count of the employees table from parent node. After traversal of 'count' node is done, the result of its traversal is the result of source expression. After the source expression is evaluated, the corresponding target expression graph is traversed. The traversal of target expression graph starts at the 'json' node, which causes setting and initialization of any information needed to work on JSON documents. The exact information may be implementation dependent and can be done in multiple ways in different example embodiments. The 'employee' node is traversed next, and it returns the 'employees' JSON object in the current context. If no 'employees' object is present, then an empty JSON object is created and returned. After the 'total' node is traversed with the value returned by source expression execution, the 'total' field of the JSON object returned by the parent node is set to the value returned by the source expression.

Returning to the mapping graph 400, the second child of rule0 node, rule3 is traversed after rule2 node is done. The rule3 node contains named contexts that are evaluated first before traversing its children. Furthermore, the rule2 node is a loop node that traverses the current node and its children repeatedly based on the loop variant. The loop variant is the named context 'emp', which gets evaluated to the next value to use for the next loop iteration. The first named context emp is evaluated by traversing the expression graph associated with it. The graph associated with it is shown in FIG. 4 as expression graph 410. The traversal of expression graph 410 starts at the 'db', node which initializes and returns information of the configured database. The 'employees' node is traversed next, and it returns the information of employees table in the database. The 'all; node is traversed next, and it returns the information or data of all the rows of employees table returned by parent node. The information can be a collection or iterator. The exact information and structure may be implementation dependent. The 'each' node is traversed next, and it denotes the looping behavior. The first traversal of 'each' node returns the first element with single employee information from the collection or iterator returned by parent node, and the current traversal state in stored. For subsequent traversal of the expression graph 410, the 'each' node is directly traversed, returning the next element of the collection or iterator. Once the collection or iterator is exhausted, the traversal state of the expression graph is reset and the loop finishes. After the evaluation of the named context 'emp', the context 'photo' is evaluated by traversing the expression graph. The 'photo' context is a context that returns the same result for each iteration of the loop. After the evaluation of the named contexts in rule rule3, children of rule3 are traversed. The traversal of children is similar to that in the rule2 node, but all the rules executed for each iteration of the loop, with named context 'emp' holding the different information for each iteration. The traversal of children causes creation and population of a JSON employee object. After the traversal of children, the source expression graph of the rule rule3 is traversed. The traversal of the source expression returns the current JSON employee object in the context. The target expression is then traversed to set the JSON employee object to the details field of JSON employees object. After that, iteration of the loop is completed. The next iteration starts with evaluation of named context 'emp', and it returns the next employee information. In the flowchart of FIG. 7, the rule3 node would be processed using operations 712-724.

The traversal of conditional child node of rule rule9 is similar to rule0. This conditional node has multiple associated expression graphs. Each graph is traversed in turn until one evaluates to true. Once an expression graph is evaluated to true, its corresponding children are traversed.

It will be appreciated that the term ontology is well known in the industry and covers a much wider set of possibilities for applying mechanisms than just rules. In this disclosure, there can be a variety of uses of different mechanisms commonly defined as ontologies in addition to rules such as, for example, naming and definition of types, properties and interrelationships of entities that exist for a particular domain, use of heuristics, etc. Although certain example embodiments are described mainly using rules, this should not be seen as limiting as shown, for example, in the possible use of heuristics.

Although certain example embodiments have been described in connection with XML, JSON, and example syntax, etc., it will be appreciated that these are merely examples that may or may not necessarily correspond to what may be used in different example embodiments. Instead, it will be appreciated that the example techniques described herein are not dependent on any specific programming language, runtime environment, syntax, ontology defining approach, etc.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for mapping from one or more source information sets to one or more target information sets, the system comprising:
   at least one memory storing a plurality of mapping ontologies each associating a first declarative expression with the one or more source information sets from which to read first information, and a second declarative expression with the one or more target information sets to which second information determined based upon the read first information is written; and
   at least one processor,
   wherein the memory further storing computer readable instructions that, when executed by the at least one processor, cause the system to:
   generate a mapping graph, using a mapping graph creator, by parsing the plurality of mapping ontologies for the one or more source information sets to obtain the one or more target information sets, wherein the mapping graph having a plurality of nodes arranged according to an execution flow; and
   generate, using a mapping graph executor, the one or more target information sets, by traversing, at runtime execution, the mapping graph according to the execution flow to evaluate mapping rules and the expression graphs, included in the mapping graph, to map from the one or more source information sets to the one or more target information sets,
   wherein multiple sources of various Multipurpose Internet Mail Extension (MIME) types can be accessed as the one or more source information sets, and
   wherein the mapping graph includes a plurality of nodes in which (a) the nodes representing ones of the plurality of mapping ontologies is a first set of nodes, (b) a second set of nodes represent respective conditional expressions, and (c) a connection between a first node and a second node, of the plurality of nodes, represent a respective parent-child relationship between the first node and the second node.

2. The system according to claim 1, wherein the at least one memory further stores a plurality of mapping resolvers, each of the first and second declarative expressions being associated with at least one of the stored mapping resolvers for accessing one or more information sets, and wherein the traversing includes, at respective nodes, of the plurality of nodes, of the mapping graph, executing the corresponding resolvers to map information from a source one of the information sets to a target one of the information sets.

3. The system according to claim 1, wherein at least one of the mapping ontologies specifies a context, and wherein the at least one processor is further configured to evaluate declarative expressions and/or conditional expressions represented in the at least one of the mapping ontologies in the specified context.

4. The system according to claim 1, wherein the at least one processor is further configured to traverse, in response to a change in one of the source information sets, at least a portion of the mapping graph to update the generated one or more target information sets.

5. The system according to claim 1, wherein the at least one processor is further configured to dynamically update, in response to a change in any of the one or more source information sets, one or more of the target information sets.

6. The system according to claim 1, wherein the at least one processor is further configured to dynamically update, in response to a change in the mapping graph, one or more of the target information sets.

7. The system according to claim 6, wherein the at least one processor is further configured to, in response to the change, load into the memory a second version of the mapping graph with updates corresponding to the change to operate simultaneously with a first version of the mapping graph not updated in response to the change.

8. The system according to claim 6, wherein the at least one processor is further configured to, in response to the change, update in the memory only a part of the mapping graph.

9. The system according to claim 1, wherein each of the first declarative expression and the second declarative expression includes data model information for accessing respective information sets.

10. The system according to claim 1, wherein at least one of the source information sets include unstructured data, and wherein the first declarative expression of one of the plurality of nodes includes all data model information for accessing an item of content in the at least one source information set.

11. The system according to claim 1, wherein the at least one processor is further configured to perform the traversing of each node in the mapping graph according to an atomic function.

12. The system according to claim 1, wherein the source information sets include content from a plurality of sources each providing content of a respective MIME type, and wherein at least one of the output information sets include transformed content based upon the content from the plurality of sources.

13. The system according to claim 1, wherein the at least one processor is further configured to perform nested, hierarchical, and/or chained evaluation of the first declarative expression and/or the second declarative expression.

14. The system according to claim 1, wherein the multiple sources of various MIME types can be accessed using declarative mapping expressions and rules that are semantically independent of each other.

15. The system according to claim 1, wherein the one or more source information sets are represented in a structured document and converted into a single object document.

16. The system according to claim 15, wherein the structured document is input into the mapping graph creator wherein the mapping graph creator parses the structured document to generate the mapping graph.

17. The system according to claim 1, wherein each node in the mapping graph composed of separate expression graphs corresponding to one or more source and target expressions, and wherein the mapping graph creator configured to access a mapping ontologies repository and a mapping resolvers repository.

18. The system according to claim 1, wherein at least the first and second declarative expressions contain at least some of the plurality of mapping ontologies embodied in programming code logic.

19. A method for mapping from one or more source information sets to one or more target information sets, the method comprising:
  storing a plurality of mapping ontologies in at least one memory, each mapping ontology from the plurality of mapping ontologies associating a first declarative expression with the one or more source information sets from which to read first information, and a second declarative expression with the one or more target information sets to which second information determined based upon the read first information is written;
  generating, by at least one processor communicably coupled to said memory and using a mapping graph creator, a mapping graph by parsing the plurality of mapping ontologies for the one or more source information sets to obtain the one or more target information sets, wherein the mapping graph having a plurality of nodes arranged according to an execution flow; and
  generating, by the at least one processor using a mapping graph executor, the one or more target information sets, by traversing, at runtime execution, the mapping graph according to the execution flow to evaluate mapping rules and the expression graphs, included in the mapping graph, to map from the one or more source information sets to the one or more target information sets,
  wherein multiple sources of various Multipurpose Internet Mail Extension (MIME) types can be accessed as the one or more source information sets, and
  wherein the mapping graph includes a plurality of nodes in which (a) the nodes representing ones of the plurality of mapping ontologies is a first set of nodes, (b) a second set of nodes represent respective conditional expressions, and (c) a connection between a first node and a second node, of the plurality of nodes, represent a respective parent-child relationship between the first node and the second node.

20. A non-transitory computer-readable storage medium having stored thereon computer program instructions that, when executed by a processor of computer having a memory configured to store a plurality of mapping ontologies, wherein each stored mapping ontology associates a first declarative expression with one or more source information sets from which to read first information and a second declarative expression with one or more target information sets to which second information determined based upon the read first information is written, causes the computer to perform operations comprising:
  generating, by at least one processor communicably coupled to said memory and using a mapping graph creator, a mapping graph by parsing the plurality of mapping ontologies for the one or more source information sets to obtain the one or more target information sets, wherein the mapping graph having a plurality of nodes arranged according to an execution flow; and
  generating, by the at least one processor using a mapping graph executor, the one or more target information sets by traversing, at runtime execution, the mapping graph according to the execution flow to evaluate mapping rules and the expression graphs, included in the mapping graph, to map from the one or more source information sets to the one or more target information sets,
  wherein multiple sources of various Multipurpose Internet Mail Extension (MIME) types can be accessed as the one or more source information sets, and
  wherein the mapping graph includes a plurality of nodes in which (a) the nodes representing ones of the plurality of mapping ontologies is a first set of nodes, (b) a second set of nodes represent respective conditional expressions, and (c) a connection between a first node and a second node, of the plurality of nodes, represent a respective parent-child relationship between the first node and the second node.

21. The non-transitory computer-readable storage medium according to claim 20, wherein the memory further stores a plurality of mapping resolvers, each of the first and second declarative expressions being associated with at least one of the stored mapping resolvers for accessing one or more information sets, and wherein the traversing includes, at respective nodes, of the plurality of nodes, of the mapping graph, executing the corresponding resolvers to map information from a source one of the information sets to a target one of the information sets.

* * * * *